United States Patent [19]

Morse et al.

[11] 4,222,781

[45] Sep. 16, 1980

[54] OPTICALLY CLEAR COPPER HALIDE PHOTOCHROMIC GLASS ARTICLES

[75] Inventors: David L. Morse; Thomas P. Seward, III, both of Corning, N.Y.

[73] Assignee: Corning Glass Works, Corning, N.Y.

[21] Appl. No.: 66,912

[22] Filed: Aug. 16, 1979

[51] Int. Cl.² ............................ C03C 3/26; C03C 3/08
[52] U.S. Cl. ..................... 106/47 Q; 106/54; 106/DIG. 6
[58] Field of Search ................. 106/DIG. 6, 54, 47 Q

[56] References Cited

U.S. PATENT DOCUMENTS

| | | | |
|---|---|---|---|
| 3,325,299 | 6/1967 | Araiyo | 106/DIG. 6 |
| 3,954,485 | 5/1976 | Seward et al. | 106/DIG. 6 |
| 4,076,544 | 2/1978 | Kerks et al. | 106/DIG. 6 |
| 4,166,745 | 9/1979 | Araiyo et al. | 106/DIG. 6 |

FOREIGN PATENT DOCUMENTS 560842  8/1977  U.S.S.R. ............................ 106/DIG. 6

*Primary Examiner*—O. R. Vertiz
*Assistant Examiner*—Mark Bell
*Attorney, Agent, or Firm*—Kees van der Sterre; Clinton S. Janes, Jr.

[57] ABSTRACT

Silver-free, cadmium-free, copper halide-based alkali aluminoborosilicate glasses exhibiting good optical clarity and good photochromic darkening and fading are provided by controlling the alkali, $Al_2O_3$ and $B_2O_3$ concentrations in the base glass and/or adding $MoO_3$ or $WO_3$ thereto.

7 Claims, No Drawings

OPTICALLY CLEAR COPPER HALIDE PHOTOCHROMIC GLASS ARTICLES

BACKGROUND OF THE INVENTION

The present invention is in the field of photochromic glasses and particularly relates to non-silver halide photochromic glasses containing copper halide constituents as the photochromic phase.

Photochromic glasses containing silver halide microcrystals as the photochromic phase are by far the most common of the commercially produced photochromic glasses, being used primarily for optical and ophthalmic applications. However, the relatively high cost of these glasses is disadvantageous for glazing and similar uses where large volumes of glass are required.

Silver-free photochromic glasses containing copper and/or cadmium halides as photochromic constituents have been described by Araujo in U.S. Pat. No. 3,325,299 and by Seward et al. in U.S. Pat. No. 3,954,485. Also, optically clear photochromic glasses containing both copper and cadmium halides, and exhibiting photochromic properties suitable for ophthalmic applications, have been disclosed by Araujo et al. in a commonly assigned U.S. Pat. application Ser. No. 861,129, filed Dec. 16, 1977, now U.S. Pat. No. 4,166,745.

While useful photochromic properties can be developed in glasses containing both copper and cadmium at times and temperatures moderate enough to avoid the introduction of haze or opacity into the glass, the same has not been true of glass compositions containing only copper halides as the photochromic ingredients. Hence the silver-free cadmium-free glass compositions disclosed by Araujo in U.S. Pat. No. 3,325,299 are extremely difficult to heat-treat for photochromic development without introducing haze or opacifying crystal phases into the glass, primarily because of the rather severe heat treatments required to develop photochromic properties therein. This fact is illustrated by the work of A. A. Kuznetsov et al., reported in the *Sov. J. Opt. Technol.*, 45(3), March 1978, pages 163-165. Yet glasses containing only copper halides as the main photochromic constituents offer a substantial advantage in batch cost, an important factor where large volumes of glass would be required, and in addition do not necessitate the handling of toxic cadmium batch materials.

It is therefore a principal object of the present invention to provide glass compositions for photochromic glasses comprising copper halides as the photochromic constituents which can be treated for photochromic development under relatively mild heat treating conditions of time and temperature, and which heretofore have substantially higher utility for the production of optically clear copper halide photochromic glasses than the compositions known to the prior art.

It is a further object of the invention to provide glass compositions useful for producing copper halide-containing glasses treatable for photochromic development at temperatures substantially below the softening point of the glass, so that the surface quality of the glass article made therefrom may remain substantially unaffected by the photochromic development heat treatment.

Other objects and advantages of the invention will become apparent from the following description thereof.

SUMMARY OF THE INVENTION

The present invention is broadly directed to compositional adjustments within the alkali aluminoborosilicate base glass composition system to provide optically clear copper halide photochromic glasses. Although the mode of operation of these various adjustments is not fully understood, it is believed that composition dependent effects on the precipitation of photochromic phases in the glass and redox effects in the glass during the glass melting process may be involved.

Two types of adjustment have been found effective to provide optically clear photochromic glasses at low heat treatment temperature. In the first, the relative levels of silica, boron oxide, alumina and alkali metal oxides are adjusted with particular attention to the proportions of alkali metal oxides, aluminum oxide and boron oxide in the glass, to provide a host glass matrix particularly suited for the support of copper halide photochromism. The second type of adjustment involves the addition of chemical agents to the base glass composition which are thought to promote the development of photochromic copper halide phases in the glass at lowered temperatures.

The chemical agents which have been found effective to enhance the photochromic performance of photochromic copper halide phases in alkali aluminoborosilicate base glasses are $MoO_3$ and $WO_3$. When added to copper halide-containing glasses in relatively small amounts, e.g., about 1.5% by weight, these agents have been found to substantially enhance the level of photochromic darkening as compared with a glass otherwise similar in composition and having received an equivalent heat treatment.

With respect to the adjustment of the base glass components silica, alumina, boron oxide and alkali metal oxides, the most important composition parameter appears to be the mole ratio R between (1) the total amount of alkali metal oxides in the glass, less the amount of alumina in the glass, and (2) the amount of boron oxide in the glass. The ratio R is thus defined by $R = (R_2O - Al_2O_3)/B_2O_3$, wherein $R_2O$ is the total alkali content of the glass, in mole percent, and $Al_2O_3$ and $B_2O_3$ are the alumina and boron oxide contents of the glass, also in mole percent. This ratio is hereinafter sometimes referred to as the excess alkali-boron oxide ratio.

Generally, the use of higher R ratios than have been employed in the prior art has been found beneficial in promoting the development of useful levels of photochromism in copper halide containing photochromic glasses at relatively low temperatures. At optimum ratios, optically clear photochromic glasses can be provided even without the use of chemical agents such as $WO_3$ or $MoO_3$.

Through the use of the foregoing compositional adjustments, either alone or in combination with each other, it is possible to provide optically clear photochromic glasses exhibiting quite acceptable photochromic properties, even using heat treatment temperatures in the range of about 50°-150° C. below the softening point of the glass. Thus heat treatment can be accomplished in many cases without excessive sagging of the glass and without affecting the surface finish thereof, and in all cases photochromic properties can be obtained without developing objectionable levels of haze or opacity in the product.

DETAILED DESCRIPTION

The fact that the relative proportions of alkali metal oxides, alumina and boron oxide in the base glass can have important effects on the photochromic properties of silver halide-containing photochromic glasses has recently come to the attention of workers in this field. The commonly assigned, copending application of Hares et al., Ser. No. 14,981, filed Feb. 28, 1979, provides a detailed discussion of these effects.

We have now discovered that these proportions have an even more pronounced effect in copper halide photochromic systems, such that for an arbitrarily selected photochromic heat treatment of relatively low temperature and short duration, one glass may demonstrate a very strong photochromic reponse while a second glass of very similar composition but having a slightly different excess alkali-boron oxide ratio will exhibit little or no photochromic response.

It is anticipated that this effect of excess alkali:boron oxide ratio extends over a relatively wide range of alkali aluminoborosilicate glass composition. Thus, in one aspect, the invention is deemed to encompass optically clear photochromic glass articles having compositions within the range consisting essentially, in weight percent as calculated from the batch, of about 54–66% $SiO_2$, 5–15% $Al_2O_3$, 10–30% $B_2O_3$, 8–15% total of alkali metal oxides selected from the group consisting of $Na_2O$, $K_2O$ and $Li_2O$, 0.5–1.5% total of oxides selected from the group consisting of $As_2O_3$, $Sb_2O_3$ and $As_2O_5$, 0.7–1.5% CuO, 0.1–1.0% Cl, 0.1–1.5% Br, 0–2.5% F and 0–3% total of oxides selected from the group consisting of $WO_3$ and $MoO_3$, wherein the mole ratio R, as hereinabove defined equals or exceeds a value of about 0.3. The fact that optically clear glasses exhibiting a useful level of photochromic darkening are obtained within this composition range is attributed to the combined effect of the relatively high excess alkali:boron oxide ratio in these glasses and to the presence of appropriate amounts of CuO, Cl, Br and one or more of the compounds $As_2O_3$, $Sb_2O_3$ and $As_2O_5$ therein.

Within the above-described broad composition range, the strong effect of R on photochromic development characteristics has been documented in glasses wherein the $SiO_2$ content is in the range of about 55–63%, the $Al_2O_3$ content is about 6–12%, the $B_2O_3$ content is about 15–19%, the total content of alkali metal oxides is about 8–13%, the CuO content is about 0.8–1.2%, the Cl content is about 0.2–0.5%, the Br content is about 0.7–0.9%, and the total content of $MoO_3$ and $WO_3$ is about 0.7–1.6%. Photochromic properties are clearly enhanced within this field of composition by maintaining the ratio R, as hereinabove defined, within the range of about 0.35–0.45.

Although the use of $WO_3$ and $MoO_3$ in the above described glasses is not essential, it is clearly beneficial in enhancing the photochromic darkening of the glass. In addition, however, we have found that these agents can also be used to enhance photochromic darkening in copper halide-containing alkali aluminoboroilicate glasses, irrespective of excess alkali:boron oxide mole ratio, over a wide range of base glass composition. Hence, the invention further encompasses optically clear copper halide-containing photochromic glasses having compositions consisting essentially in weight percent as calculated from the batch, of about 50–66% $SiO_2$, 5–15% $Al_2O_3$, 10–30% $B_2O_3$, 8–15% total of alkali metal oxides selected from the group consisting of $Na_2O$, $K_2O$ and $Li_2O$, 0.5–1.5% total of oxides selected from the group consisting of $As_2O_3$, $Sb_2O_3$ and $As_2O_5$, 0.7–1.5% CuO, 0.1–1.0% Cl, 0.1–1.5% Br, and 0–2.5% F, wherein the composition additionally contains at least one oxide selected from the group consisting of $WO_3$ and $MoO_3$ in an amount at least effective to enhance the photochromic properties of the glass.

The amount of $WO_3$ or $MoO_3$ effective to enhance the photochromic properties of a selected copper halide-containing glass will depend upon the composition of the base glass, the relative concentrations of the so-called photochromic constituents Cu, Br and Cl therein, and other composition factors, but that amount can readily be determined by routine experiment. By an enhancement in photochromic properties in accordance with the present invention is meant an improved level of photochromic darkening or fading by comparison with a glass of otherwise similar composition and equivalent heat treatment. Typically, best results are obtained by using concentrations of $WO_3$ and/or $MoO_3$ totaling about 0.7–1.6% by weight of the glass composition.

Within the above-described broad range of alkali aluminoborosilicate glass composition advantageously affected by the use of these oxides, a smaller range of glass composition has been identified as preferred. These are compositions within the broader range wherein the $SiO_2$ content is about 52–63% (by weight), the $Al_2O_3$ content is about 6–12%, the $B_2O_3$ content is about 15–29%, the total alkali metal oxide content is about 8–13%, the CuO content is about 0.7–1.2%, the Cl content is about 0.2–0.5%, and the Br content is about 0.7–0.9%.

Specific examples of glass compositions suitable for providing optically clear copper halide-containing photochromic glass articles according to the invention are set forth in Table I below. The compositions are given in parts by weight as calculated from the batch. Trace amounts of iron, titanium and other impurities introduded into the glass are not reported, inasmuch as these were not deemed to affect the properties of the glasses.

TABLE I

| | 1 | 2 | 3 | 4 | 5 | 6 | 7 | 8 | 9 | 10 |
|---|---|---|---|---|---|---|---|---|---|---|
| | (parts by weight) | | | | | | | | | |
| $SiO_2$ | 52.5 | 58.6 | 56.10 | 56.12 | 56.15 | 56.6 | 59.9 | 60.09 | 61.96 | 59.9 |
| $Al_2O_3$ | 7.18 | 11.5 | 11.59 | 11.59 | 11.59 | 11.7 | 9.5 | 9.37 | 8.25 | 9.3 |
| $B_2O_3$ | 28.1 | 17.5 | 16.85 | 16.49 | 16.13 | 17.0 | 16.9 | 16.55 | 16.4 | 16.1 |
| $Na_2O$ | 7.86 | 7.2 | 7.63 | 7.96 | 8.29 | 7.05 | 7.00 | 6.9 | 5.89 | 6.56 |
| $K_2O$ | — | 1.5 | 1.49 | 1.49 | 1.49 | 2.51 | 1.52 | 0.58 | 1.05 | 1.53 |
| $Li_2O$ | 1.98 | 2.0 | 2.01 | 2.01 | 2.02 | 2.03 | 2.02 | 1.98 | 1.96 | 1.99 |
| $As_2O_5$ | 0.81 | 1.0 | 0.83 | 0.83 | 0.83 | 0.840 | 0.835 | 0.94 | 0.93 | 0.94 |
| CuO | 0.79 | 0.75 | 0.97 | 0.97 | 0.97 | 0.839 | 0.833 | 1.0 | 1.0 | 1.0 |
| Cl | 0.42 | 0.25 | 0.30 | 0.30 | 0.30 | 0.302 | 0.300 | 0.34 | 0.34 | 0.35 |
| Br | 0.25 | 0.25 | 0.75 | 0.75 | 0.75 | 0.797 | 0.792 | 0.81 | 0.81 | 0.82 |
| F | 2.15 | 2.0 | — | — | — | — | — | — | — | — |

TABLE I-continued

| | (parts by weight) | | | | | | | | | |
|---|---|---|---|---|---|---|---|---|---|---|
| | 1 | 2 | 3 | 4 | 5 | 6 | 7 | 8 | 9 | 10 |
| $WO_3$ | 0.79 | — | 1.47 | 1.47 | 1.47 | 1.49 | 1.48 | 1.43 | 1.41 | — |
| $MoO_3$ | — | — | — | — | — | — | — | — | — | 1.51 |

Table IA reports the approximate relative concentrations of the base glass constituents silica, boron oxide, alumina, and alkali metal oxides in the glasses of Table I, in cation percent of the base glass. For the purposes of computing the mole ratio R, the relative amounts of the constituents $WO_3$, CuO, $As_2O_5$, Cl, Br, F and the like are unimportant, and may be considered merely as additions to the base glass.

Also included in Table IA are values of the mole ratio R for each glass, wherein $R = (R_2O - Al_2O_3)/B_2O_3$ as hereinabove defined. R is computed in each case from the ratio of the molar concentrations (or equivalently, in this case, the cation concentrations) of alkali metal oxides ($R_2O$), $Al_2O_3$ and $B_2O_3$ in the base glass.

TABLE 1A

| | 1 | 2 | 3 | 4 | 5 | 6 | 7 | 8 | 9 | 10 |
|---|---|---|---|---|---|---|---|---|---|---|
| $SiO_2$ | 39.5 | 46.4 | 45.4 | 45.4 | 45.4 | 45.3 | 48.3 | 49.4 | 51.4 | 49.4 |
| $B_2O_3$ | 36.6 | 23.9 | 23.5 | 23.0 | 22.5 | 23.5 | 23.5 | 23.5 | 23.5 | 23.0 |
| $Al_2O_3$ | 6.4 | 10.8 | 11.1 | 11.1 | 11.1 | 11.1 | 9.1 | 9.1 | 8.1 | 9.0 |
| $Na_2O$ | 11.5 | 11.1 | 12.0 | 12.5 | 13.0 | 11.0 | 11.0 | 11.0 | 9.5 | 10.5 |
| $Li_2O$ | 6.0 | 6.3 | 6.5 | 6.5 | 6.5 | 6.6 | 6.6 | 6.6 | 6.6 | 6.5 |
| $K_2O$ | — | 1.5 | 1.5 | 1.5 | 1.5 | 2.6 | 1.6 | 0.6 | 1.1 | 1.6 |
| R value $\left[\dfrac{R_2O - Al_2O_3}{B_2O_3}\right]$ | 0.30 | 0.34 | 0.38 | 0.41 | 0.44 | 0.39 | 0.43 | 0.39 | 0.39 | 0.42 |

Glasses such as reported in Table I above may be melted from batches compounded of conventional oxide or other glass batch constituents, provided in proportions calculated to yield the components reported in Table I in the amounts specified therein as the batch is fused to form a molten glass. Melting may be carried out in crucibles, pots, tanks or other suitable melting apparatus, and the molten glass formed into glass articles by conventional forming methods such as drawing, spinning, pressing or the like. The glass articles thus formed may be annealed prior to heat treatment, or may be directly heated to develop the photochromic properties therein and then subsequently cooled to ambient temperatures.

Heat treatments useful for converting glass articles having compositions such as reported in Table I above into photochromic glass articles are relatively mild; hence, Examples 3-10 from Table I will develop useful photochromic properties following heat treatment at 600° C. for 45 minutes, while Example 1 may be heat treated at 580° C. for 30 minutes and Example 2 at 600° C. for 30 minutes to attain useful results.

Table II reports photochromic properties determined on flat, ground and polished glass plates having compositions approximating those reported in Table I above, after heat treatment as above described. Included in Table II for each glass are an initial transmittance value $T_o$, which is the transmittance, as a percent, of a plate of 2.0 mm. thickness prior to any photochromic darkening thereof, a darkened transmittance value $T_{D10}$, which is the transmittance value obtained after darkening each plate by a 10-minute exposure to simulated solar radiation, and a faded transmittance value $T_{F5}$, which is the transmittance obtained after permitting each plate to fade for 5 minutes in the absence of light.

TABLE II

| (Table 1) Example No. | 1 | 2 | 3 | 4 | 5 | 6 | 7 | 8 | 9 | 10 |
|---|---|---|---|---|---|---|---|---|---|---|
| $T_o$ | 73.2 | 80.5 | 77 | 80 | 80 | 85 | 85 | 79 | 79 | 75 |
| $T_{D10}$ (80° F.) | 27.4 | 68.7 | 35 | 34 | 65 | 41 | 74 | 16 | 14 | 17 |
| $T_{F5}$ (80° F.) | 46.0 | 75.0 | 51 | 53 | 74 | 56 | 79 | 31 | 28 | 32 |

In addition to the composition parameters previously discussed in connection with the photochromic characteristics of the glasses herein described, a number of other compositional factors are important if good photochromic performance in a clear glass article is required. First, all of the copper halide-containing compositions in which we have observed good photochromic properties have been alkali aluminoborosilicate base glass compositions in which both chlorine and bromine, as well as copper, have been present as essential constituents. Fluorine, while a useful optional constituent which appears to aid in the formation or separation of photochromic phases within the glass, can induce haze if used in excessive quantities and is not essential for the development of good photochromic behavior. On the other hand, as previously noted, $WO_3$ and $MoO_3$ have a very pronounced effect on photochromic phase development, so that compositions containing one or both of these constituents are among the most preferred glass compositions where good photochromic darkening is desired.

With respect to alkali/boron oxide/alumina balance, it has been observed in at least one base glass composition area that the excess alkali/boron oxide ratio R can have a critical effect on copper halide photochromism, and that the optimum ratio may depend on the silica content of the glass. For example, the substitution of less than about 0.4 wt.% $B_2O_3$ for a corresponding amount of $Na_2O$ in Example 3 of Table I, with all other compositional and thermal parameters unchanged, can result in a glass exhibiting no photochromic properties after the standard 600° C.-45 minute heat treatment.

It is believed that this extreme sensitivity is attributable to changes in the oxidation state of the photochromic elements in the glass, caused perhaps by changes in the redox state of the glass matrix, such that if the excess alkali/boron oxide ratio is varied, compensating changes are required in other composition, melting or heat treating factors to retain optimum photochromic performance. In any event, while the compositions reported in Table I reflect the best balance between silica level and excess alkali/$B_2O_3$ ratio, in terms of optimum photochromic performance, which we have achieved, it will be appreciated that other ratios could alternatively be employed, provided the necessary adjustments in composition and heat treatment are made to secure or optimize photochromic development at the particular ratio selected for use.

Control over the redox state of the glass is also the reason for incorporating one or more of the components $As_2O_3$, $Sb_2O_3$, and $As_2O_5$ therein. Other redox control agents have been tried in these base glass compositions, but generally do not provide the degree of control over the redox condition of the melt which is desirable in copper halide-containing photochromic glass systems. Neither overly-oxidized glasses, which appear blue in color (perhaps due to the presence of $Cu^{+2}$ therein), nor overly-reduced glasses, which appear red-brown in color (perhaps due to the presence of $Cu^0$ therein) can readily be heat-treated to provide acceptable photochromic properties therein.

Composition Example 2 in Table I is representative of base glass compositions suitable for sheet drawing applications, that glass exhibiting the stability known to be important for the economical production of high quality potentially photochromic glass sheet. As has been noted in the production of silver halide-containing glass sheet by overflow downdraw sheet-forming techniques, a glass exhibiting a viscosity of at least about $10^4$ poises at its liquidus temperature, and also long-term stability against devitrification while in contact with platinum at viscosities in the range of $10^4$–$10^6$ poises, is strongly to be preferred for such applications. This combination of properties is readily obtainable by adjusting the levels of the base glass constituents $SiO_2$, $Al_2O_3$, $B_2O_3$ and alkali oxides within the broad composition ranges set forth above.

Copper halide-containing photochromic glasses such as hereinabove described offer some significant advantages in terms of both processing and performance when compared with silver halide photochromic glasses of the commercially available types. First, they exhibit good darkening on exposure to visible as well as ultraviolet light, having a darkening sensitivity range extending from about 350 to about 650 nm, and are not bleached by the action of visible light in the manner of certain silver halide photochromic glasses.

In addition, copper halide-containing photochromic glasses typically exhibit a darkening behavior which is relatively unaffected by the temperature of the glass. Thus, they exhibit particularly good darkening at elevated temperatures where most silver halide photochromic glasses exhibit relatively poor darkening.

To illustrate the very low temperature dependence of these glasses, Table III below compares darkening and fading performance for a copper halide-containing (CuX) photochromic glass, provided according to the present invention, and a commercial silver halide-containing (AgX) photochromic glass, considered to have excellent (very low) temperature dependence characteristics. Included in Table III are the test temperatures at which the glasses were darkened and faded, as well as darkened transmittances ($T_{D60}$) and faded transmittances ($T_{F5}$) (in percent) for each glass at each temperature.

Darkening was induced by a 60-minute exposure to simulated solar radiation, and fading by a 5-minute period in the absence of light. The transmittance values for the copper halide-containing (CuX) glass were determined on drawn sheet glass of 1.5 mm thickness; the corresponding values for the silver halide-containing (AgX) glass were determined on ground and polished 20 mm thick sheet. The initial (undarkened) transmittance of the copper halide-containing sample was 87%, and of the silver halide-containing sample, about 90%. The silver halide glass was not tested for darkening at 60° C., but would probably exhibit very little darkening at that temperature.

TABLE III

| Test Temperature | CuX Glass Transmittance | | AgX Glass Transmittance | |
| --- | --- | --- | --- | --- |
| | $T_{D60}$ | $T_{F5}$ | $T_{D60}$ | $T_{F5}$ |
| −18° C. | 25 | 30.5 | 20 | 21.5 |
| 0° C. | 27 | 35 | 19.5 | 24.5 |
| 20° C. | 28 | 41 | 22.5 | 55 |
| 40° C. | 38.5 | 59 | 47 | 81 |
| 60° C. | 48 | 72 | — | — |

As previously noted, many of these glasses can be heat-treated to develop photochromic properties at temperatures between 50° and 150° C. below the glass softening point, temperatures at which photochromic development may be accomplished without excessively sagging or destroying the surface finish of the glass. This characteristic, in combination with the relatively low batch cost of these glasses, makes them particularly suitable candidates for large volume sheet glass applications, such as architectural or marine and aircraft glazing, where photochromic sheet glass of good optical quality may be required.

We claim:

1. An optically clear photochromic glass article having a composition consisting essentially, in weight percent as calculated from the batch, of about 54–66% $SiO_2$, 5–15% $Al_2O_3$, 10–30% $B_2O_3$, 8–15% total of alkali metal oxides selected from the group consisting of $Na_2O$, $K_2O$ and $Li_2O$, 0.5–1.5% total of oxides selected from the group consisting of $As_2O_3$, $Sb_2O_3$, and $As_2O_5$, 0.7–1.5% CuO, 0.1–1.0% Cl, 0.1–1.5% Br, 0–2.5% F and 0–3% total of oxides selected from the group consisting of $WO_3$ and $MoO_3$, wherein the molar ratio R, as defined by the expression:

$$R = (R_2O\text{-}Al_2O_3)/B_2O_3$$

wherein $R_2O$ is the total molar concentration of alkali metal oxides in the glass, $Al_2O_3$ is the molar concentration of aluminum oxide in the glass, and $B_2O_3$ is the molar concentration of boron oxide in the glass, has a value of at least about 0.3.

2. A glass article in accordance with claim 1 wherein the $SiO_2$ content is about 55–63%, the $Al_2O_3$ content is 6–12%, the $B_2O_3$ content is about 15–19%, the total alkali metal oxide content is about 8–13%, the CuO content is about 0.8–1.2%, the Cl content is about 0.2–0.5%, the Br content is about 0.7–0.9%, and the total content of $MoO_3$ and $WO_3$ is about 0.7–1.6%.

3. A glass article in accordance with claim 2 wherein R is within the range of about 0.35–0.45.

4. An optically clear photochromic glass article having a composition consisting essentially, in weight percent as calculated from the batch, of about 50–66% $SiO_2$, 5–15% $Al_2O_3$, 10–30% $B_2O_3$, 8–15% total of alkali metal oxides selected from the group consisting of Na$_2$O, K$_2$O and Li$_2$O, 0.5-1.5% total of oxides selected from the group consisting of As$_2$O$_3$, Sb$_2$O$_3$ and As$_2$O$_5$, 0.7-1.5% CuO, 0.1-1.0% Cl, 0.1-1.5% Br, 0-2.5% F, and at least one oxide selected from the group consisting of WO$_3$ and MoO$_3$ in an amount at least effective to enhance the photochromic properties of the glass.

5. A glass article in accordance with claim 4 which contains 0.7-1.6% total of WO$_3$ and/or MoO$_3$ by weight.

6. A glass article in accordance with claim 5 wherein the SiO$_2$ content is about 52-63%, the Al$_2$O$_3$ content is about 6-12%, the B$_2$O$_3$ content is about 15-29%, the total alkali metal oxide content is about 8-13%, the CuO content is about 0.7-1.2%, the Cl content is about 0.2-0.5%, and the Br content is about 0.7-0.9%.

7. A glass article in accordance with claim 6 wherein the mole ratio R given by the expression:

$$R = (R_2O - Al_2O_3)/B_2O_3$$

wherein R$_2$O corresponds to the total molar concentration of alkali metal oxides in the glass, Al$_2$O$_3$ corresponds to the molar concentration of aluminum oxide in the glass, and B$_2$O$_3$ corresponds to the molar concentration of boron oxide in the glass, is within the range of about 0.35-0.45.

UNITED STATES PATENT AND TRADEMARK OFFICE
CERTIFICATE OF CORRECTION

PATENT NO.  : 4,222,781
DATED       : September 16, 1980
INVENTOR(S) : David L. Morse and Thomas P. Seward, III It is certified that error appears in the above-identified patent and that said Letters Patent are hereby corrected as shown below:

Column 1, line 55, change "heretofore" to --therefore--.

Column 3, line 18, change "alkali-boron" to --alkali:boron--.

Column 4, line 6, change "aluminoboroilicate" to --aluminoborosilicate--.

Column 5, line 17, change "R-$(R_2O-Al_2O_3)/B_2O_3$" to --R=$R_2O-Al_2O_3)/B_2O_3$--.

Signed and Sealed this

*Seventeenth* Day of *February 1981*

[SEAL]

*Attest:*

*Attesting Officer*

RENE D. TEGTMEYER

*Acting Commissioner of Patents and Trademarks*